C. LAMBŒUF.
ELECTRICAL REGULATING APPARATUS.
APPLICATION FILED JAN. 13, 1911.

1,051,238.

Patented Jan. 21, 1913.

2 SHEETS—SHEET 1.

Witnesses:

Inventor:
Charles Lambœuf
Attorney

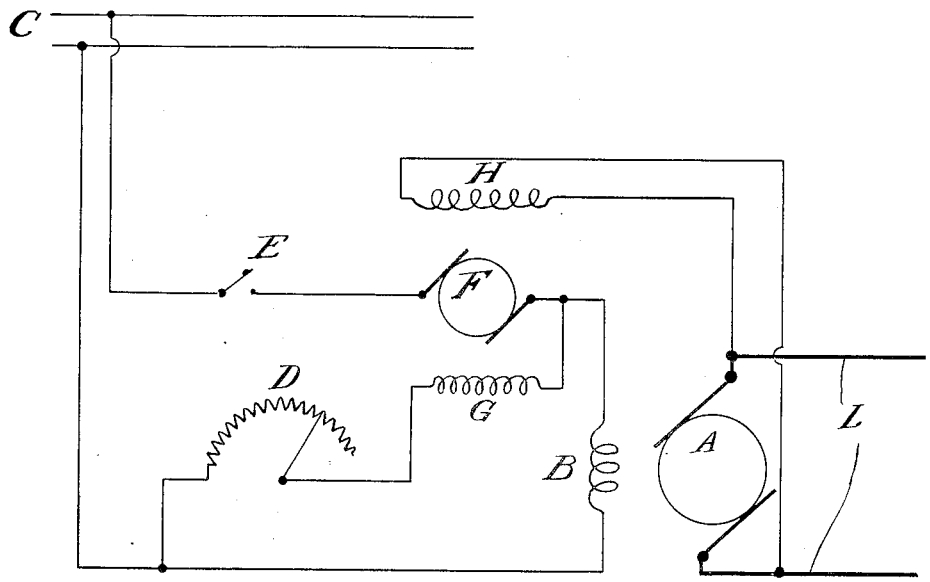
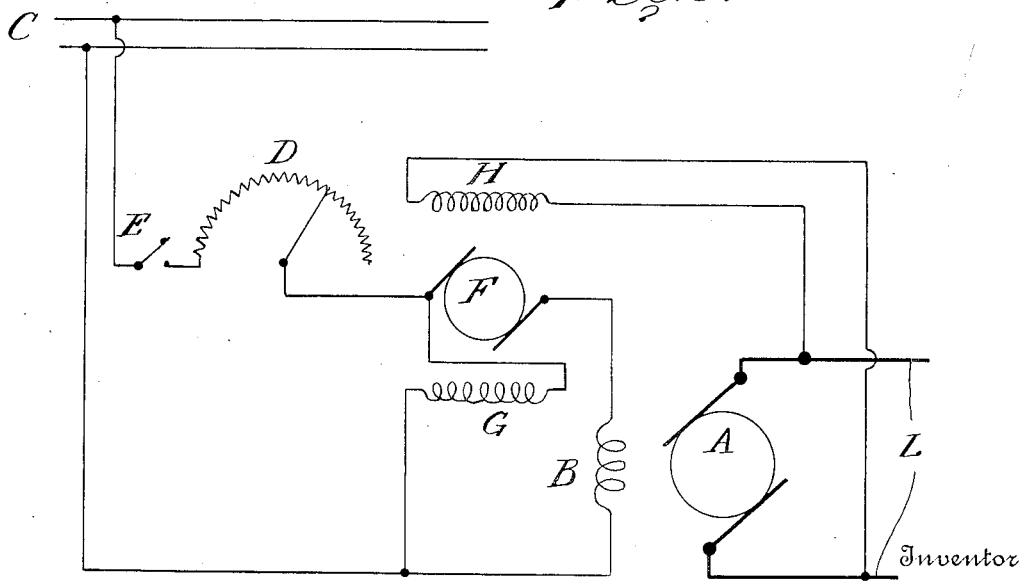

UNITED STATES PATENT OFFICE.

CHARLES LAMBŒUF, OF BELFORT, FRANCE, ASSIGNOR TO SOCIÉTÉ ALSACIENNE DE CONSTRUCTIONS MÉCANIQUES, OF BELFORT, FRANCE.

ELECTRICAL REGULATING APPARATUS.

1,051,238.   Specification of Letters Patent.   Patented Jan. 21, 1913.

Application filed January 13, 1911. Serial No. 602,420.

*To all whom it may concern:*

Be it known that I, CHARLES LAMBŒUF, a citizen of the French Republic, and resident of Belfort, France, have invented certain new and useful Electrical Regulating Apparatus, of which the following is a specification.

It is a well known fact that in a dynamo electric machine the electromotive force only follows with a certain delay the variations produced in the tension of excitation by the control apparatus (field rheostat for instance). This delay is caused by the self induction of the circuit of excitation of the machine. It is often very important to reduce as much as possible this delay. This is for instance the case in the starting generators of the reversible motors of rolling mills; it is then necessary to be able to vary and completely reverse in a minimum space of time the electromotive force of the generator in order to increase as much as possible the output of the rolling mill.

This invention relates to a process which allows to reduce this delay.

The method on which this process is based consists in producing automatically at the terminals of the winding of excitation of the machine, a variation of tension which is greater than that which would be necessary for obtaining the required variation of the electromotive force. This tension is also automatically brought back to its normal value as soon as the desired electromotive force is attained.

Figure 1:
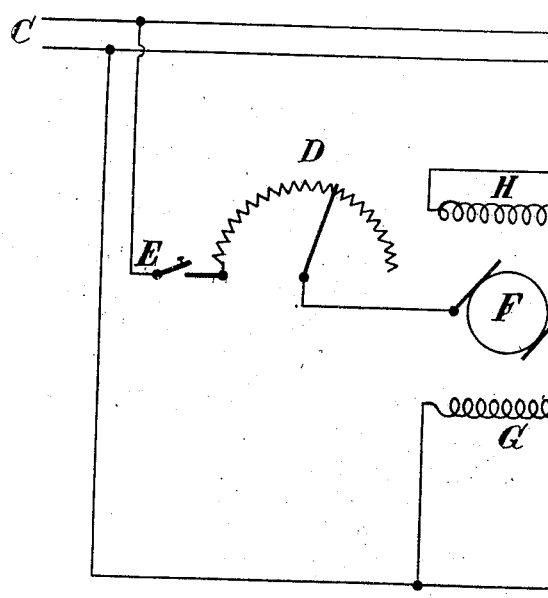
Figure 2:
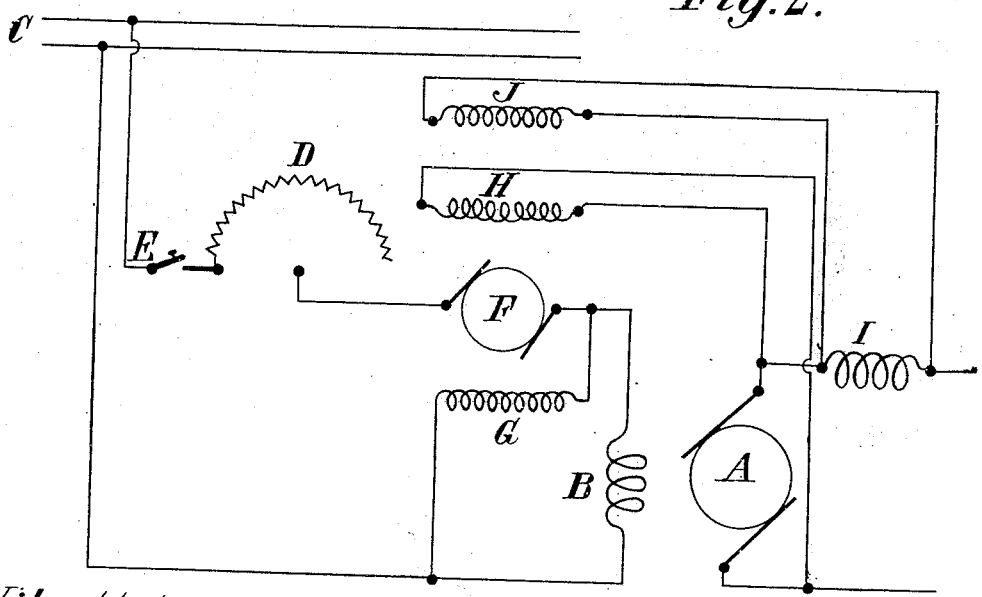

In the drawing, Figure 1 is a diagram illustrating my invention; Fig. 2 is a similar view, showing an additional coil on the booster; Fig. 3 is a diagram the same as Fig. 1 except for the location of the rheostat; and, Fig. 4 is a diagram the same as Fig. 1 except for the connection of the exciting coil of the booster.

In the drawing similar elements are indicated by similar reference letters.

Referring first to Fig. 1, A represents the dynamo electric machine in which it is desired to rapidly produce a given electromotive force, and B is the main field winding of the dynamo, the circuit of this winding extending to a suitable source of current, indicated by the conductors C, the potential of this source being such as to cause normal excitation of the field B of the dynamo.

Arranged in series relation with the winding B is the armature F of a voltage increasing or reducing dynamo provided with two windings of excitation G and H the ampere-turns of which partially or entirely neutralize each other when the desired electromotive force is attained in A. It will be supposed first that the said ampere-turns neutralize each other entirely; thereafter the case will be treated where they neutralize each other only partially. The winding G is connected with the terminals of main field B and arranged in such a manner that it causes F to work so as to increase the voltage while H which is connected with the terminals of the machine A has a tendency to cause F to work so as to reduce the voltage. The booster F is always a small one and consequently its windings of excitation only produce a weak self induction.

The function is as follows: It will be first supposed that the rheostat D being adjusted according to the electromotive force to be obtained in A, the switch E is closed. By reason of what has just been said of the machine F the current corresponding to the tension which is applied to it, at once establishes itself in the winding G. In any case the current will establish itself in G much more rapidly than in H as the tension at the terminals of this winding has the same delay as the electromotive force of the machine A. The machine F will then work so as to increase the voltage and B is subjected at the beginning to the sum of the tension of the source C and that furnished by the booster F. It will be observed that the winding G is itself subjected to the sum of the said two tensions whereby its action is still increased and the voltage of B still more reinforced. As readily seen the current circulating in B will rapidly increase owing to the surplus voltage which is applied thereto and, at the same time, the electromotive force of the machine A and consequently the tension at the terminals of the winding H will rapidly increase. The ampere-turns of H will therefore increase whereby the tension furnished by F will be gradually reduced. Finally when the electromotive force attains in A the desired value, the effect of the booster F becomes null as the ampere-turns of G and H neutralize each other. The action of the device may be rendered more energetic by maintaining during a large part of the time necessary for establishing the electromotive force, a high over-voltage in B. It will be sufficient to attain this object, that the magnetic circuit of the booster F be such that at the beginning the magnetizing ampere-turns of G saturate it strongly, as long as this saturation will exist, the over-voltage of B will be maintained sensibly in spite of the increase of the ampere windings of H.

If a certain electromotive force is established at A and the rheostat D is actuated so as to cause it to be varied, the machine F again starts working. If the tension applied to B is increased i. e. if it is desired to increase the electromotive force of A, the winding G becomes preponderant and the booster F works so as to increase the voltage and increase the voltage of the winding B. If on the contrary the rheostat D is actuated so as to reduce the electromotive force of A, the ampere turns of H will be preponderant, as the tension at the terminals of A decreases only slowly, the dynamo F works so as to reduce the voltage and reduces still further the tension applied at B, thus accelerating the diminution of the electromotive force. In both cases, the rapidity of the action of the machine F is still increased by the variation of the tension which its function produces at the terminals of the winding G. As readily understood the function of this device is absolutely automatic. At each variation which it is desired to produce in the electromotive force of the main machine, one has automatically at one's disposal at the terminals of its circuit of excitation a variation of tension which is greater (in any given proportion) than that which would be necessary. Automatically again, the tension existing at the terminals of the exciting circuit returns to its normal value as soon as the electromotive power is attained. The time required for establishing a given electromotive force will depend upon the working conditions of the machine A. It is needless to say that the variation of the electromotive force which may be obtained may attain the complete reversing as in the case of reversible rolling mills where the reversing of the direction of working is obtained by reversing the tension at the terminals of the starting dynamos. It may, in certain cases, be advantageous to proportion the windings G and H so that they will not neutralize one another when the electromotive force of the machine A is normal, or equal to that which it generates when the field B is excited by the source C alone. In that case, the booster will operate to maintain a potential at the terminals of the coil B which is higher or lower than the voltage of the source C according to which of the coils, G or H, would preponderate at the normal voltage of the machine A.

The winding G on the booster, instead of being connected in shunt only to the main winding G of the generator A, as shown in Figs. 1, 2 and 3, can be connected in shunt to the booster armature F, as well as said winding B, as shown in Fig. 4. With this arrangement the voltage at the terminals of the winding G is not increased by the action of the booster, but the arrangement may be satisfactorily used where the booster is small and the self induction of the coil G will not prevent the current from rapidly energizing the coil. With this arrangement the voltage at the terminals of the coil G is constant for any given position of the arm of the rheostat, but the voltage and current in the coil H will vary with any change in electromotive force at the terminals of the machine A, and this will cause the booster to operate to increase or decrease the voltage at the terminals of the field winding B in accordance with the decrease or increase in the electromotive force of the machine A. It will now be supposed that the electromotive force of the machine A varies for any possible cause. Immediately the action of the ampere turns of the winding H of the booster F will vary in the same sense. The booster starts working and automatically modifies the tension at the terminals of B until the equilibrium is again established between the ampere-turns of the winding G and those of the winding H that is to say until the electromotive force of A has again assumed its original value. The device will therefore work as an automatic tension controller. The rheostat D, may be placed in series with the booster armature and the fields G and B, as shown in Figs. 1 and 4, or it may be inserted in series only with said armature and the winding G, as indicated at K, Fig. 3. This latter arrangement is more economical because the current for the field B does not pass through the rheostat.

In Fig. 2 of the drawing I have illustrated a modification suitable for relieving the machine A from the injurious effect of sudden changes in load, or, in other words, for deadening the shock to the machine which comes from such sudden changes in load. In this figure the arrangement of circuits is the same as in Fig. 1, with the coils I and J added. The coil I is an inductive resistance arranged in the main circuit L, and which opposes any sudden change in the rate of current flow in said circuit, and the coil J is arranged on the booster and its terminals are connected to the terminals of the coil I, as shown. Any change in the rate of current flow in the line L will be resisted by the coil I, and a current proportional to the rate of change will flow through the coil J, which coil will be arranged upon the booster to assist or oppose the coil H, accordingly as the machine A is a dynamo or a motor, and the booster will operate to cause a higher or lower voltage, as desired, at the terminals of the coil B. Thus a dampening of the current flow in the circuit L and a variation in the field B will be produced which will relieve the machine A from injurious shocks.

The arrangement shown in the present case has the advantage of being very rapid in action. It will be understood, however, that if the shock deadening coils are used, the booster will not maintain a constant voltage in the machine A, as the coil J, when active, would destroy the equilibrium between the coils H and G. It is needless to say that the machine F may be actuated in any suitable manner, and that the source of current C and the controlling apparatus may be of any suitable kind.

Having now fully described my said invention, what I claim and desire to secure by Letters Patent, is:—

1. The combination with a current source, of a dynamo electric machine having a main field winding connected to said source for separate excitation, a booster having its armature connected to said source and in series with said main field, for over-exciting the latter, and a field coil in circuit with the armature of said dynamo electric machine for reducing the voltage of the booster.

2. The combination with a current source, of a dynamo electric machine having a main field winding connected to said source for separate excitation, a booster having its armature and energizing field connected to said source, the armature of said booster being connected in series with said main field winding and adapted to over-excite the same, and a field coil in circuit with the armature of said dynamo electric machine for reducing the voltage of the booster.

3. The combination with a current source, of a dynamo electric machine having a main field winding connected to said source for separate excitation, a booster having its armature and energizing field connected to said source, the armature of said booster being connected in series with said main field winding and adapted to over-excite the same, the energizing field of the booster being in series with the booster armature and in shunt to said main field, and a field coil in circuit with the armature of said dynamo electric machine for reducing the voltage of the booster.

4. The combination with a current source, of a dynamo electric machine having a main field winding connected to said source for separate excitation, a booster having its armature and energizing field connected to said source, the armature of said booster being connected in series with said main field winding and adapted to over-excite the same, the energizing field of the booster being in series with the booster armature and in shunt to said main field, a rheostat in series with the booster armature its energizing field and said main field, and a field coil in circuit with the armature of said dynamo electric machine for reducing the voltage of the booster.

5. The combination with a current source, of a dynamo electric machine having a main field winding connected to said source for separate excitation, a booster having its armature connected to said source and in series with said main field, for over-exciting the latter, a rheostat in series with the booster armature, and a field coil in circuit with the armature of said dynamo electric machine for reducing the voltage of the booster.

6. The combination with a current source, of a dynamo electric machine having a main field winding connected to said source for separate excitation, a booster having its armature and energizing field connected to said source, the armature of said booster being connected in series with said main field winding, and adapted to over-excite the same, a rheostat in series with the armature and energizing field of the booster, and a field coil in circuit with the armature of said dynamo electric machine for reducing the voltage of the booster.

In testimony whereof I have hereunto set my hand in presence of two witnesses.

CHARLES LAMBŒUF.

Witnesses:
JAENNE VIQET,
J. BUNOT.